United States Patent [19]

Cederblad

[11] 4,234,166
[45] Nov. 18, 1980

[54] CLUTCHED WINCH

[75] Inventor: Claes Å. Cederblad, Skanör, Sweden

[73] Assignee: Spanset Inter AG, Basel, Switzerland

[21] Appl. No.: 931,096

[22] Filed: Aug. 4, 1978

[30] Foreign Application Priority Data

Aug. 11, 1977 [SE] Sweden ............................. 7709084

[51] Int. Cl.³ .................. A63B 61/04; B60P 7/06; B61D 45/00; B65D 63/10
[52] U.S. Cl. ........................... 24/68 CD; 74/506; 74/575; 188/82.3; 188/82.9; 242/54 R; 410/103
[58] Field of Search ............... 24/68 CD; 74/504, 505, 74/506, 511, 575; 105/168 T, 477; 188/82.1, 82.3, 82.9; 192/93 A; 242/54 R, 55; 254/163, 164, 165, 166, 161; 280/179 R, 179 A; 410/103

[56] References Cited

U.S. PATENT DOCUMENTS

| 487,391 | 12/1892 | Haring | 188/82.3 |
|---|---|---|---|
| 1,145,217 | 7/1915 | Sandifer | 188/82.3 |
| 1,513,129 | 10/1924 | O'Connor | 74/506 |
| 2,989,267 | 6/1961 | Mehl | 254/165 X |
| 3,038,740 | 6/1962 | Blunden | 105/368 T X |
| 3,181,886 | 5/1965 | Blunden et al. | 105/368 T X |
| 3,428,331 | 2/1969 | Morgan et al. | 280/179 R |
| 3,988,007 | 10/1976 | Freiburger, Jr. | 254/164 |
| 4,155,537 | 5/1979 | Bronson et al. | 254/164 |

Primary Examiner—Howard Beltran

[57] ABSTRACT

A winch for tightening lines and webbing on the lashing of cargos, the winch having a frame which consists of two preferably oval plates which are spaced from each other by means of cross-pieces, of which the one is used as an anchorage for the winch and the other for securing one end of the webbing, and a winding roller located between the cross-pieces and connectible to the other webbing end and having a ratchet mechanism in the form of two disks abutting against each other under the action of a spring, the disks having radial locking surfaces on their sides in abutment with each other and being movable apart for canceling the locking action by means of a clutch ring located between the disks.

4 Claims, 4 Drawing Figures

CLUTCHED WINCH

The present invention relates to a winch for lines and webbing, comprising a frame with a winding roller with a ratchet mechanism.

In goods transport it is necessary, in order to satisfy the safety requirements of both authorities and private individuals, to reliably retain the cargo so that it is not shifted on movement of the, for example, lorry or ship. This retention or lashing of the cargo is often effected by means of lines or webbing which previously were tightened simply by hand but are nowadays normally tightened by means of some form of winch. The winch is normally in the form of a winding roller fixed in a frame and with a ratchet wheel with which a locking pawl, actuated by gravity or by a spring, engages. Winches of this type function satisfactorily but have disadvantages which restrict their use. Thus, it is possible to realize but a restricted tractive force, because the dimensions of the line or webbing are limited by the size of the winch; and moreover a restricted retentive force determined by the abutment surface between the ratchet wheel and the locking pawl which, in prior art devices hitherto utilized, is relatively slight and cannot be increased, since this would entail an unacceptable increase of the size of the winch. It is also disadvantageous that prior art winches are often exposed to such rough handling that their function is jeopardized, as is particularly the case in unloading of the cargo when the winches are manipulated with hammers or crow bars.

Winches of the above type are shown and described in, for example, U.S. Pat. Nos. 3,038,740, 3,181,886 and 3,428,331.

The object of the present invention is to obviate the above disadvantages inherent in prior art winches and to realize such a winch having considerably greater tractive and retentive forces and with an easily releasable, protected ratchet mechanism which, for release purposes, need be actuated by but a slight traction or pressure force. However, the which are kept spaced from each other by means of cross-pieces, one of which constitutes a member for anchorage of the frame and the other being connectible to the one end of the line or webbing. Moreover, the winding roller is journalled in the plates between the cross-pieces and has a line or webbing anchorage portion. Finally, the ratchet mechanism is disposed on the one plate concentrically with the winding roller and has radial locking surfaces disposed in a housing.

Because both of the webbing and line ends can be connected to the frame, a double webbing or line strength will be obtained and a "tackle effect" will be obtained on tightening. The retentive force can be increased many times over in that the ratchet mechanism has radial locking surfaces. If the frame plates, according to a further characteristic feature of the invention, are oval, the winch may be easily dragged without the risk of damage, a risk which is also further reduced in that the parts of the winch are located such that they are protected to the greatest possible extent.

The ratchet mechanism is protected in its housing, whereby its function is ensured, the mechanism consisting of two ratchet plates which have saw-tooth-shaped ridges which abut against each other but may easily be separated by means of a clutch ring, this rendering violent manipulation unnecessary. The winch according to the invention is, furthermore, constructed in a simple manner and can, therefore, be manufactured at a low price.

The nature of the present invention and its aspects will be more readily understood from the following brief description of the accompanying drawings, and discussion relating thereto.

Figure 1:
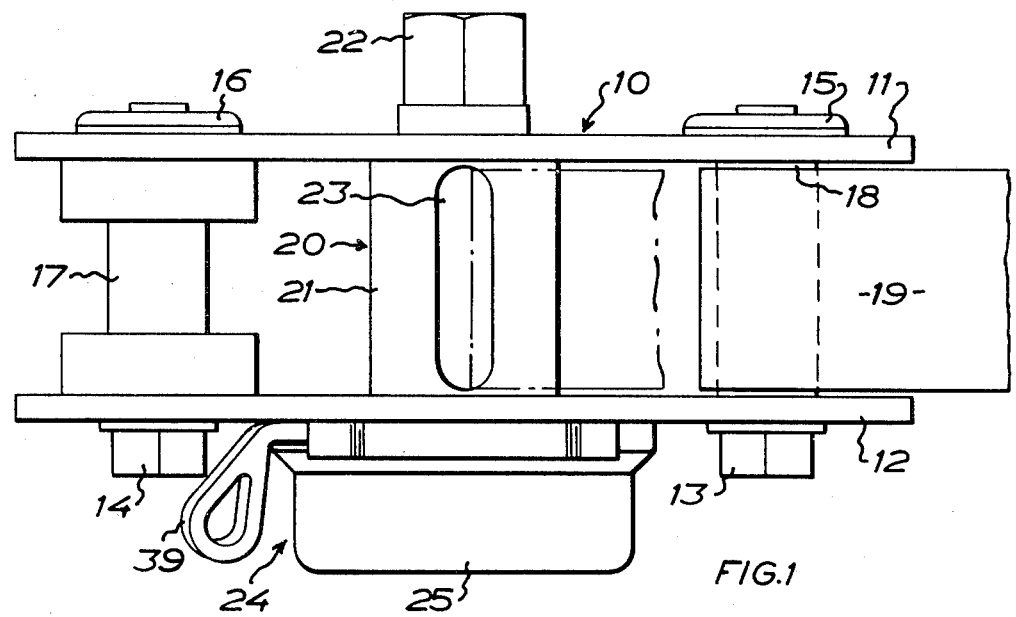
FIG. 1 is a top plan view of a winch according to the invention with a webbing connected thereto.
Figure 2:
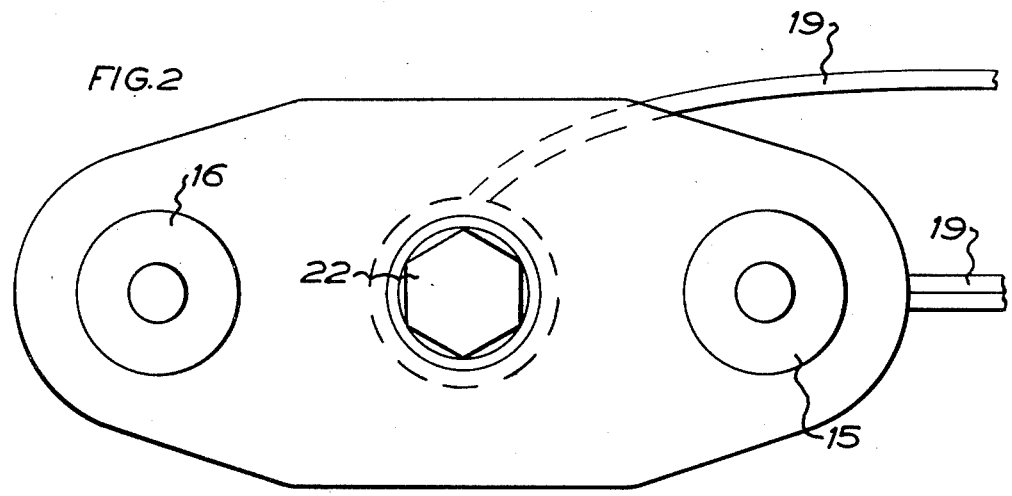
FIG. 2 shows the winch of FIG. 1 from one side.
Figure 3:
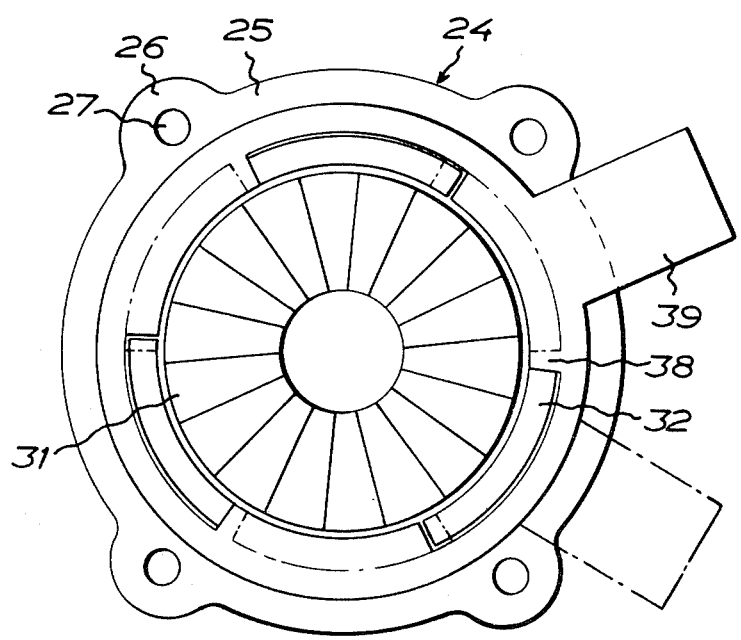
FIG. 3 shows a housing, fixedly mounted on the winch according to FIGS. 1 and 2, for a ratchet mechanism.

The winch shown in FIG. 1 consists of a frame 10 which has two oval plates 11 and 12 which are kept at a predetermined distance from each other by means of bolts 13 and 14 extending through the plate 12 and screwed into openings of opposite thread in the plate 11 and into annular, threaded members 15 and 16, respectively disposed on the outside of the plate 11. Spacer means 17 and 18 between the plates 11 and 12 are disposed on the bolts 14 and 13, respectively. The bolt 14 with its associated members 16 and 17 is used for anchoring the frame 10, for example by means of a hook fixedly disposed in the deck of a vessel. The bolt 13 with the members 15, 18 serves as a fixing device for a webbing 19 of a type well-known in the art, for example of nylon fabric, the webbing being laid about the bolt 13 in the space between the plates 11 and 12 and sewn together, as shown in FIG. 2, throughout a distance which is dependent upon the calculated maximum tractive force.

A winding roller 20 is rotatably journalled between the two bolts 13 and 14, the roller having, between the plates 11 and 12, a winding-up portion for the other end of the webbing 19 which is fixed to this portion 21 in a conventional manner in a slot 23 extending through the portion. For rotation of the roller 20, the roller is provided with a hexagonal head 22 on the outside of the plate 11, with which head a suitable spanner may be brought into engagement. The opposite end of the winding roller 20 protrudes from the outside of the plate 12 for engagement with a ratchet device 24 which is surrounded by a casing or housing 25. The housing 25 is fixedly retained on the outside of the plate 12 by means of counter-sunk screws (not shown) which extend through the plate 12 into engagement with threaded openings 27 in lugs 26 provided on the housing.

The ratchet mechanism includes a disk 28 concentric with the winding roller 20 and fixedly connected thereto. The disk has, on its side facing away from the winding portion 21, saw-tooth-shaped ridges 30 with radial locking surfaces 41. A correspondingly designed ratchet disk 40 with saw-tooth-shaped ridges 31 and locking surfaces 42 engages with this ratchet disk 28. It will be apparent that if the two disks 28 and 40 are placed with the saw-tooth-shaped ridges 30 and 31 in abutment against each other, they may be turned with respect to each other in one direction of turn but not in the opposite direction. As is particularly apparent from FIG. 4, wedge-shaped ramps 32 are provided throughout the periphery of the disk 40, for reasons which will be apparent from the following explanation. The disk 40 is intended to be placed in the housing 25 with projections 33, provided on the rear side of the disk 40, arranged in grooves 35 which are defined by strips 34 which are bent at an angle and are fixed to the defining surface 43 of the housing 25 facing away from the winding roller 20. A helical spring 36 is intended to be disposed between the disk 40 and this defining surface 43.

Figure 4:
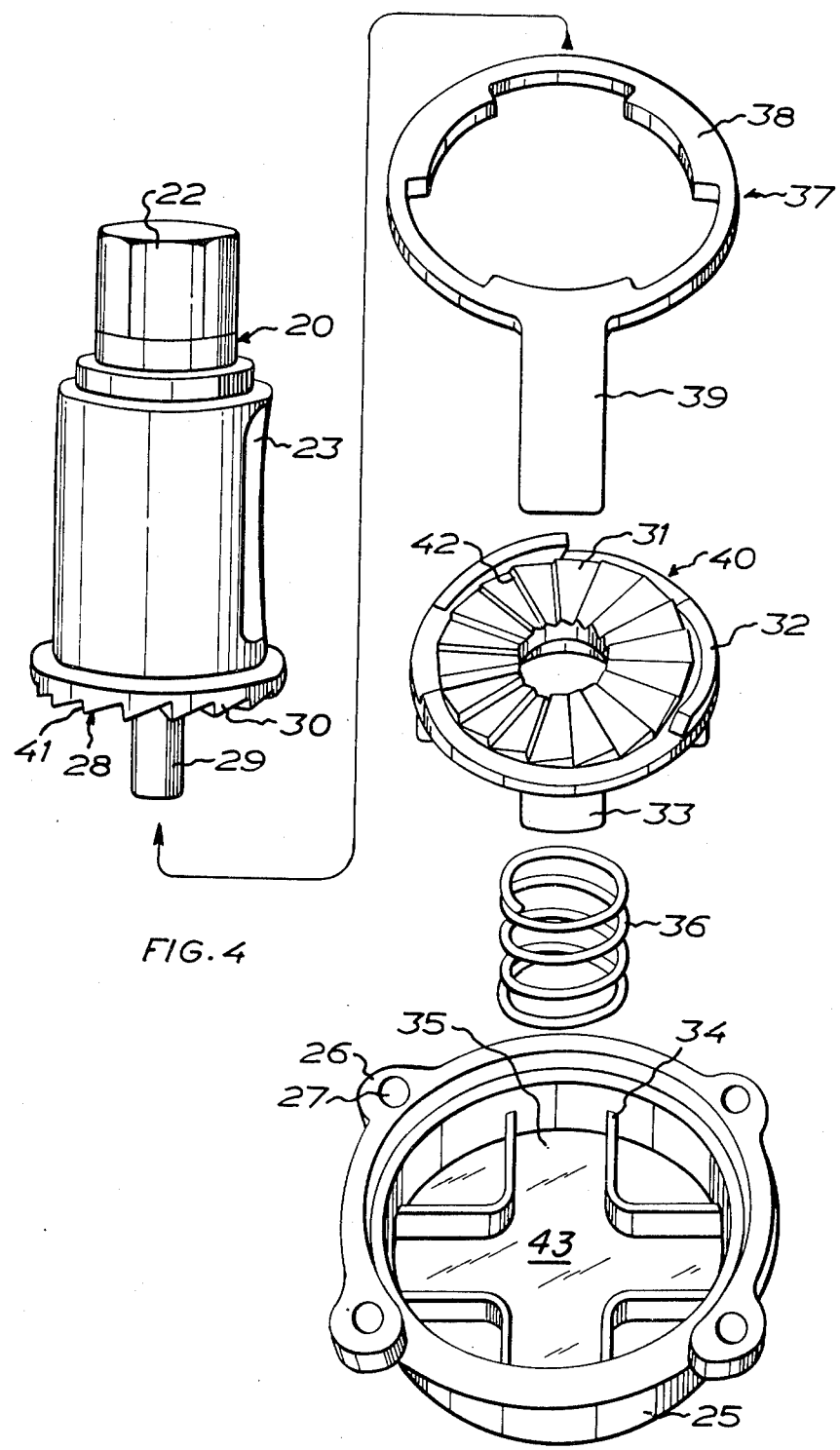
FIG. 4 illustrates, in exploded view, the separate parts of the winding roller and a ratchet mechanism of the winch.

It is apparent from FIG. 4 that, with the winding roller 20 mounted in the plates 11 and 12 and the ratchet disk 40 placed in the housing 25 with the spring 36 disposed between the disk 40 and the defining surface 43 of the housing 25, and with the housing 25 fixed to the outer side of the plate 12, the disk 40 will be urged by the spring against the disk 28, whereby the winding roller 20 may be rotated in one direction but not in the opposite direction so that a webbing 19 connecting to the winding roller 20 can be tightened. However, it is also desirable to be able to release the webbing 19 and, for this purpose, a clutch ring 37 is placed between the disks 28 and 40, the ring being provided with three inwardly directed clutch portions 38 extending throughout the inner periphery of the ring. The wedge-shaped ramps 32 on the ratchet disk 40 are also three in number and are of such length that the portions 38 of the clutch ring 37 may be placed between these ramps 32 without coming into contact therewith. The clutch ring 37 is rotatable between the ratchet disks 28 and 40 and it will be apparent to the skilled reader that if the ring 37 is rotated, the portions 38 will slide up on the wedge-shaped ramps 32 on the disk 40 in a direction towards the upper end of these portions 38, the disk 40 being urged in a direction towards the defining surface 43 of the housing 25 against the action of the spring 36. After a certain rotation, the locking surfaces 41, 42 will be disengaged from each other and the winding roller 20 is released. For centering the ratchet disk 40 and the spring 36 in the housing 25, the winding roller has a central journal 29 which projects from the ratchet disk 28 and extends through the ratchet disk 40 and projects into the spring 36. The clutch ring 37 is journalled such that it is located closely adjacent the outer surface of frame plate 12 whereby unintentional operation of and damage to the arm 39 is avoided. The outer end of the arm 39 is somewhat outwardly bent and has an opening whereby, for example, a lanyard can be fixed so that the locking action can be released a distance from the winch.

In use of the winch according to the invention, the winch is first fixedly secured, whereafter the webbing 19 is connected to or placed about an object or a portion thereof, which is to be held in place, and the free end of the webbing 19 is run back to the winch and inserted in the slot 23. Thereafter, the winding roller 20 is rotated until the desired degree of tightening has been achieved. When the tightening is to be released on unloading the cargo, the operating arm 39 of the clutch ring 37 is actuated directly or by means of a lanyard or the like and the locking action is cancelled so that the webbing is loosened and the cargo released.

It is apparent that the double webbing entails that a considerably greater tractive force may be exercised at the same time as a certain "tackle effect" is obtained if the webbing can slip around that portion of the cargo to which it is fixed. Besides, the total locking surface is considerably greater than hitherto and the locking action can be cancelled in a simple manner at a distance from the winch, which, together with the simple, functional construction of the winch, results in a highly advantageous product.

What I claim and desire to secure by Letters Patent is:

1. A winch for lines and webbing, comprising a frame consisting of two plates spaced from each other,
    cross-pieces between said plates, one of said cross-pieces forming means for anchoring said frame to a stationary object, and another of said cross-pieces forming means for anchoring one end of a line,
    a winding roller rotatably journalled in said frame having a line securing portion thereon,
    a housing on said frame fixedly mounted to one of said plates, and
    a ratchet mechanism for said winding roller disposed in said housing,
    said ratchet mechanism comprising two ratchet disks concentric with said winding roller and in abutment with each other, one of said disks being rigidly connected to said winding roller and the other being axially movably journalled in said housing against the action of a spring, ridges which are saw-toothed shaped in cross-section on the sides of said ratchet disks facing each other having radial locking surfaces thereon, a clutch ring rotatably journalled in said housing between said ratchet disks, said ring having clutch portions directed towards its center and there is provided wedge-shaped portions along the periphery of said axially movable disk, said clutch portions being shiftable into engagement with said wedge-shaped portions by the rotation of said clutch ring for shifting of said axially movable disk against the action of said spring such that the locking surfaces of said disks are disengaged from each other, and an operating arm connected to said clutch ring and projecting from said housing adjacent the outwardly facing side of said one plate.

2. The winch as set forth in claim 1, in which the plates of the frame are oval, one of said cross-pieces being placed in the vicinity of each one of the plate ends located most distal from each other, and said winding roller being journalled intermediate of these cross-pieces.

3. The winch as set forth in claim 1, in which said cross-pieces are formed of through-bolts and spacer means which are placed between said plates.

4. The winch as set forth in claim 1, further comprising:
    projections which are disposed on said axially movable disk on that side thereof facing away from the other disk; said housing defining grooves in its side facing said axially movable disk, in which grooves said projections are axially movable; and said spring consists of a helical spring which is disposed between said axially movable disk and that side of said housing facing said disk.

* * * * *